United States Patent
Strosaker et al.

(10) Patent No.: US 10,754,630 B2
(45) Date of Patent: Aug. 25, 2020

(54) BUILD-TIME CODE SECTION-SPECIFIC COMPILER SELECTION

(71) Applicant: INTERNATIONAL BUSINESS MACHINES CORPORATION, Armonk, NY (US)

(72) Inventors: Michael T. Strosaker, Austin, TX (US); George C. Wilson, Austin, TX (US); Nathan Fontenot, Georgetown, TX (US); Christy L. Norman, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 105 days.

(21) Appl. No.: 16/001,183

(22) Filed: Jun. 6, 2018

(65) Prior Publication Data
US 2019/0377559 A1    Dec. 12, 2019

(51) Int. Cl.
*G06F 9/45* (2006.01)
*G06F 8/41* (2018.01)

(52) U.S. Cl.
CPC ............ *G06F 8/4441* (2013.01); *G06F 8/427* (2013.01)

(58) Field of Classification Search
CPC .............................. G06F 8/427; G06F 8/4441
USPC ................................................. 717/140, 144
See application file for complete search history.

(56) References Cited

U.S. PATENT DOCUMENTS

| | | | |
|---|---|---|---|
| 5,966,536 A | 10/1999 | Ravichandran | |
| 6,223,337 B1* | 4/2001 | Blume | G06F 8/443 |
| | | | 714/E11.208 |
| 6,289,505 B1 | 9/2001 | Goebel | |
| 7,712,089 B2* | 5/2010 | Opem | G06F 11/3688 |
| | | | 717/124 |
| 8,161,465 B2 | 4/2012 | Yang et al. | |
| 8,645,934 B2 | 2/2014 | Fontenot et al. | |
| 9,569,347 B2* | 2/2017 | Koju | G06F 11/3692 |
| 9,594,559 B2 | 3/2017 | Fontenot et al. | |
| 9,645,837 B2 | 5/2017 | Anyuru | |
| 10,346,293 B2* | 7/2019 | DeMarco | G06F 11/3688 |

(Continued)

OTHER PUBLICATIONS

Semantics-based obfuscation-resilient binary code similarity comparison with applications to software plagiarism detection, author: L Luo et al, published on 2014.*

(Continued)

*Primary Examiner* — Chameli Das
(74) *Attorney, Agent, or Firm* — Cantor Colburn LLP; Noah Sharkan (57) ABSTRACT

Systems, methods, and computer-readable media are described for selecting, at build time, a respective compiler and/or a respective set of compiler options for each section of code to be compiled such that the compiler/compiler options selected for each code section are optimized for that code section with respect to one or more metrics. Abstract syntax tree (AST) analysis and semantic analysis may be performed at build time for each section of code to identify the compiler/compiler options that produce compiled object code for that code section that maximizes or minimizes a desired metric. The metric according to which compiler/compiler option optimization is performed may be any suitable metric including, without limitation, performance, binary size, security, reliability, scalability, and so forth.

15 Claims, 4 Drawing Sheets

(56) References Cited

U.S. PATENT DOCUMENTS

| | | | | |
|---|---|---|---|---|
| 2005/0177821 | A1* | 8/2005 | Ogata | G06F 11/3612 717/148 |
| 2012/0167065 | A1* | 6/2012 | Urakhchin | G06F 8/37 717/143 |
| 2012/0204164 | A1* | 8/2012 | Castanos | G06F 8/443 717/153 |
| 2013/0074052 | A1* | 3/2013 | Adams | G06F 8/437 717/140 |
| 2014/0189663 | A1* | 7/2014 | Guenthner | G06F 8/456 717/146 |
| 2014/0289716 | A1* | 9/2014 | Adl-Tabatabai | G06F 8/4441 717/146 |
| 2015/0242193 | A1* | 8/2015 | Kee | G06F 8/34 717/145 |
| 2016/0147514 | A1* | 5/2016 | Baskaran | G06F 8/4434 717/150 |
| 2016/0196123 | A1* | 7/2016 | Fontenot | G06F 9/30058 717/149 |
| 2019/0272180 | A1* | 9/2019 | Kulick | G06F 9/4451 |

OTHER PUBLICATIONS

Title: Fully automatic test program generation for microprocessor cores author: F Corno, published on 2003.*

Eric Vecchie et al., "Separate compilation and execution of imperative synchronous modules," 2009 Design, Automation & Test in Europe Conference & Exhibition, 2009, pp. 1580-1583.

Grigori Fursin et al., "A practical method for quickly evaluating program optimizations," In International Conference on High-Performance Embedded Architectures and Compilers, pp. 29-46. Springer, Berlin, Heidelberg, 2005. Retrieved from https://hal.inria.fr/inria-00001054/document.

Mena Nagiub et al. "Automatic selection of compiler options using genetic techniques for embedded software design," 2013 IEEE 14th International Symposium on Computational Intelligence and Informatics (CINTI), 2013, pp. 69-74.

Cavazos, John et al. "Rapidly Selecting Good Compiler Optimizations using Performance Counters", International Symposium on Code Generation and Optimization (CGO'07); retrieved at: https://patents.google.com/scholar/14898280929322539668?q=rapidly&q=selecting&q=good&q=compiler+optimizations&q=performance&q=counters&scholar&oq=rapidly+selecting+good+compiler+optimizations+using+performance+counters; date of conference Mar. 11-14, 2007; pp. 1-14.

Pawlik, Mateusz et al. "Compare your trees with ease", tree edit distance; database research group; 2016; retrieved rom: http://tree-edit-distance.dbresearch.uni-salzburg.at/; downloaded Feb. 7, 2020; 6 pgs.

Shamir, Ron et al. "Faster Subtree Isomorphism" Preliminary version appeared in Fifth Israel Symposium on Theory of Computing and Systems (ISTCS 97); Mar. 1998 and Revised May 1999, 22 pgs.

* cited by examiner

BUILD-TIME CODE SECTION-SPECIFIC COMPILER SELECTION

BACKGROUND

The performance characteristics of object code produced by a compiler depend, in large part, on design decisions made during implementation of the compiler. As such, for the same code, different compilers may produce object code of differing quality in terms of a quantifiable metric such as performance, size, or the like. However, it is generally not the case that a single compiler will produce better quality object code than all other compilers with respect to every possible metric for every possible input.

SUMMARY

In one or more example embodiments, a method for compiling computer-executable code is disclosed. The method includes selecting a metric to be optimized in connection with a compilation of a section of the computer-executable code. The method further includes compiling a plurality of test programs using each of a plurality of different compilers to obtain a plurality of compiled test programs and calculating, for each of the plurality of compiled test programs, a respective value of the metric. The method additionally includes determining a particular test program of the plurality of test programs that is most similar to the section of the computer-executable code and determining that the respective value of the metric is optimized for a particular compiled test program corresponding to the particular test program. The method finally includes determining which compiler of the plurality of compilers was used to compile the particular compiled test program and compiling the section of the computer-executable code using the determined compiler.

In one or more other example embodiments, a system for compiling computer-executable code is disclosed. The system includes at least one memory storing computer-executable instructions and at least one processor of a sending device, the at least one processor being configured to access the at least one memory and execute the computer-executable instructions to perform a set of operations. The operations include selecting a metric to be optimized in connection with a compilation of a section of the computer-executable code. The operations further include compiling a plurality of test programs using each of a plurality of different compilers to obtain a plurality of compiled test programs and calculating, for each of the plurality of compiled test programs, a respective value of the metric. The operations additionally include determining a particular test program of the plurality of test programs that is most similar to the section of the computer-executable code and determining that the respective value of the metric is optimized for a particular compiled test program corresponding to the particular test program. The operations finally include determining which compiler of the plurality of compilers was used to compile the particular compiled test program and compiling the section of the computer-executable code using the determined compiler.

In one or more other example embodiments, a computer program product for compiling computer-executable code is disclosed. The computer program product includes a non-transitory storage medium readable by a processing circuit, the storage medium storing instructions executable by the processing circuit to cause a method to be performed. The method includes selecting a metric to be optimized in connection with a compilation of a section of the computer-executable code. The method further includes compiling a plurality of test programs using each of a plurality of different compilers to obtain a plurality of compiled test programs and calculating, for each of the plurality of compiled test programs, a respective value of the metric. The method additionally includes determining a particular test program of the plurality of test programs that is most similar to the section of the computer-executable code and determining that the respective value of the metric is optimized for a particular compiled test program corresponding to the particular test program. The method finally includes determining which compiler of the plurality of compilers was used to compile the particular compiled test program and compiling the section of the computer-executable code using the determined compiler.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments include, among other things, systems, methods, computer-readable media, techniques, and methodologies for selecting, at build-time, a respective compiler and/or a respective set of compiler options (also referred to herein as compiler settings) for each section of code to be compiled such that the compiler/compiler options selected for each code section are optimized for that code section with respect to one or more metrics. More specifically, example embodiments include systems, methods, and computer-readable media for performing abstract syntax tree (AST) analysis and semantic analysis at build-time for each section of code to identify the compiler/compiler options that produce compiled object code for that code section that maximizes or minimizes a metric of interest, as desired. The metric according to which compiler/compiler option optimization is performed may be any suitable metric including, without limitation, performance, binary size, security (e.g., resilience to return-oriented programming (ROP)), reliability, scalability, and so forth. Example embodiments may be described herein with respect to code section-specific compiler selection. However, it should be appreciated that such example embodiments are also applicable to code section-specific selection of a set of compiler options as well.

The AST and semantic analysis that is performed may be informed by empirical measurements of test programs that are designed to measure the strengths and weaknesses of compilers and compiler options with respect to various code characteristics. A non-exhaustive list of code characteristics with respect to which compiler strengths and weaknesses may be tested include aggressiveness in function inlining; ability to construct small (e.g., fast) function preambles; aggressiveness in loop unrolling; ability to avoid latency from load-hit-stores such as handling transfers between integer and floating point units (FPUs); effectiveness at register assignment (to avoid latency from internal computer processing unit (CPU) register renaming); optimization of large integer multiplications with vector instructions; optimization of numerous small arithmetic/logic operations with vector instructions; efficiency in handling long jumps; efficiency in the use of a member of a struct as a loop index; effectiveness at argument dependent name lookup (e.g., Koenig lookup) used in selecting the correct polymorphic (e.g., overloaded) function; and fast vs. effective stack smash detection.

In certain example embodiments, upon designing a collection of test programs to measure the strengths and weaknesses of compilers and compiler options with respect to various code characteristics, each such test program may be compiled using each of a multitude of different compilers and/or compiler options. As a generic, non-limiting example, assume the collection of test programs includes test program 1, test program 2, and test program 3. Further assume that compiler A having options a, b, and c and compiler B having options d, e, and f are being tested. In this example, each of test programs 1, 2, and 3 may be compiled using each of the following compiler/compiler option combinations: compiler A no options; compiler A with option a; compiler A with option b; compiler A with option c; compiler B with no options; compiler B with option d; compiler B with option e; and compiler C with option f.

A respective value of a metric that is desirable to optimize (e.g., performance, binary size, etc.) may then be calculated for each compiled test program, or in other words, each pairing of test program and compiler/compiler option combination. For instance, the performance (or whatever metric is selected) of each of compiler A with no options; compiler A with option a; compiler A with option b; and compiler A with option c in compiling each of test programs 1, 2, and 3 may be calculated. Similarly, the performance of each of compiler B with no options; compiler B with option d; compiler B with option e; and compiler B with option f in compiling each of test programs 1, 2, and 3 may be calculated. The measured performance (or whatever metric is measured) for each compiler/compiler option combination with respect to each test program may then be retained along with a respective representation of each test program such as an abstract syntax tree (AST) of each test program.

Subsequently, during a build process for an application to be optimized, a respective AST may be generated for each section of code in the application. A section of code may include any portion of code at any level of granularity. For instance, a section of code may include a function, a file, a collection of functions, a collection of files in a project, or the like. For each section of code, the corresponding build-time AST may be compared to each stored test program AST to identify a stored AST that is most similar to the build-time AST of the code section. Any suitable similarity metric for assessing the similarity between the build-time AST and the stored ASTs may be used including, but not limited to, topological similarity via subtree isomorphism or tree edit distance. After the stored AST that is most similar to the build-time AST is identified, the compiler/compiler option combination that yielded the highest metric score (e.g., maximized or minimized the metric) when compiling the test program corresponding to the most similar stored AST may be determined and selected for compiling the section of code. For instance, the compiler/compiler option combination that maximized performance, minimized binary size, or the like when compiling the test program corresponding to the most similar stored AST may be selected for compiling the section of code.

In certain example embodiments, if different compilers adhere to the same Application Binary Interface (ABI), then each file, function, or the like in a project can be built with any of the different compilers, and the resulting object files can still be linked together to form an executable. Further, different compiler options may be used for each file, function, or the like. Example embodiments provide a technique for selecting, at build-time, for compiling each section of code, a respective compiler and/or a respective set of compiler options that are best suited to the individual characteristics of the section of code.

Example embodiments provide various technical features, technical effects, and/or improvements to computer technology. For example, example embodiments provide the technical effect of dynamically determining, at build-time, a respective compiler and/or a respective set of compiler settings that optimizes a metric of interest for each section of executable code. This technical effect provides an improvement to computer technology—specifically an improvement to compiler technology—by improving the efficiency of code compilation (as measured with respect to a metric that is desirable to optimize). This technical effect and improvement to computer technology are achieved, at least in part, by the technical features of selecting, for compiling a section of code, a compiler and/or set of compiler options that maximizes or minimizes a metric of interest (e.g., maximizes performance, minimizes binary size, etc.) with respect to a test program determined to be most similar to the section of code.

Various illustrative methods and corresponding data structures associated therewith will now be described. It should be noted that each operation of the method 200 or the method 300 may be performed by one or more of the program modules or the like depicted in FIG. 1 or 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1:
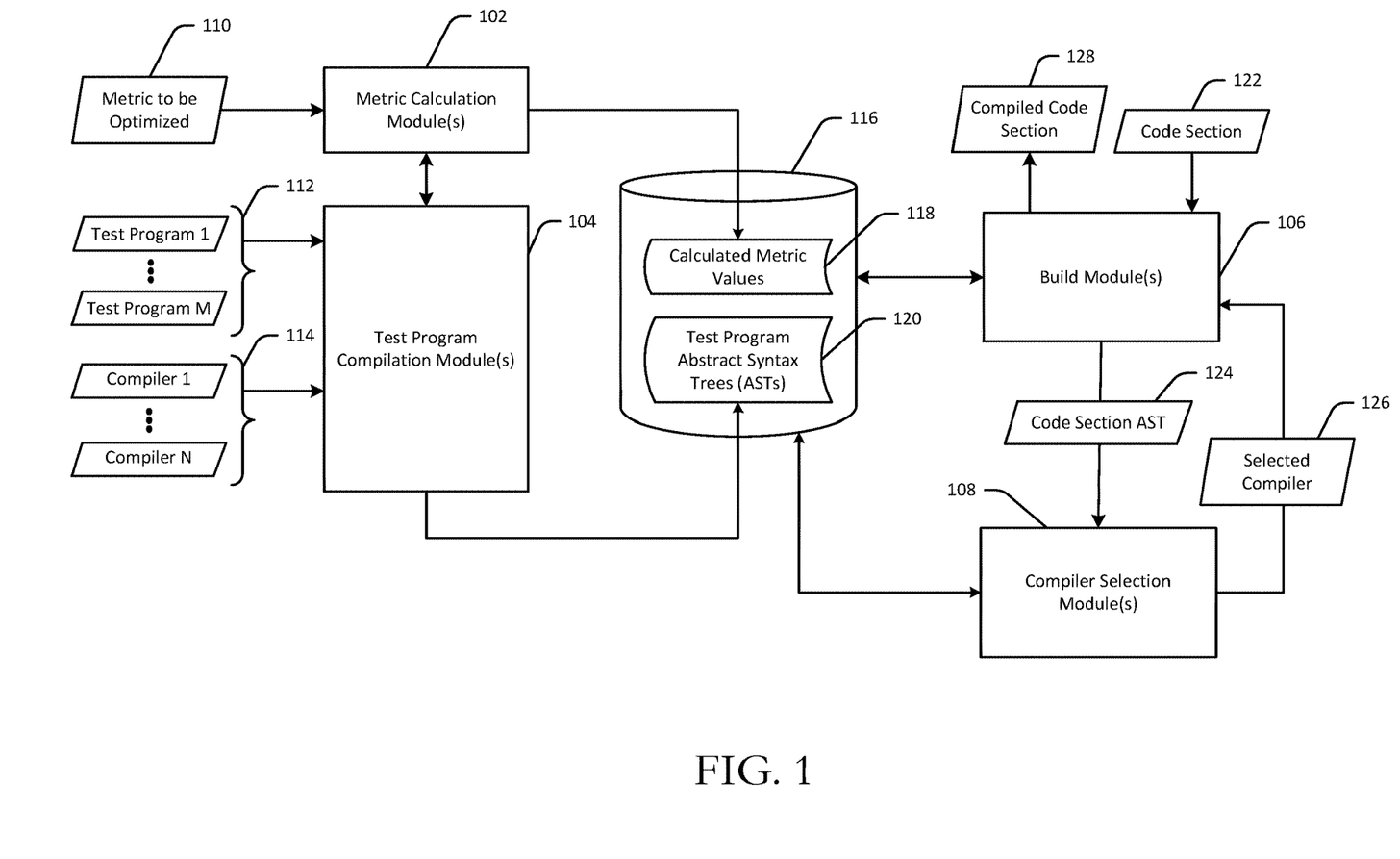
FIG. 1 is a schematic hybrid data flow/block diagram illustrating code section-specific compiler/compiler settings selection in accordance with example embodiments.
Figure 2:
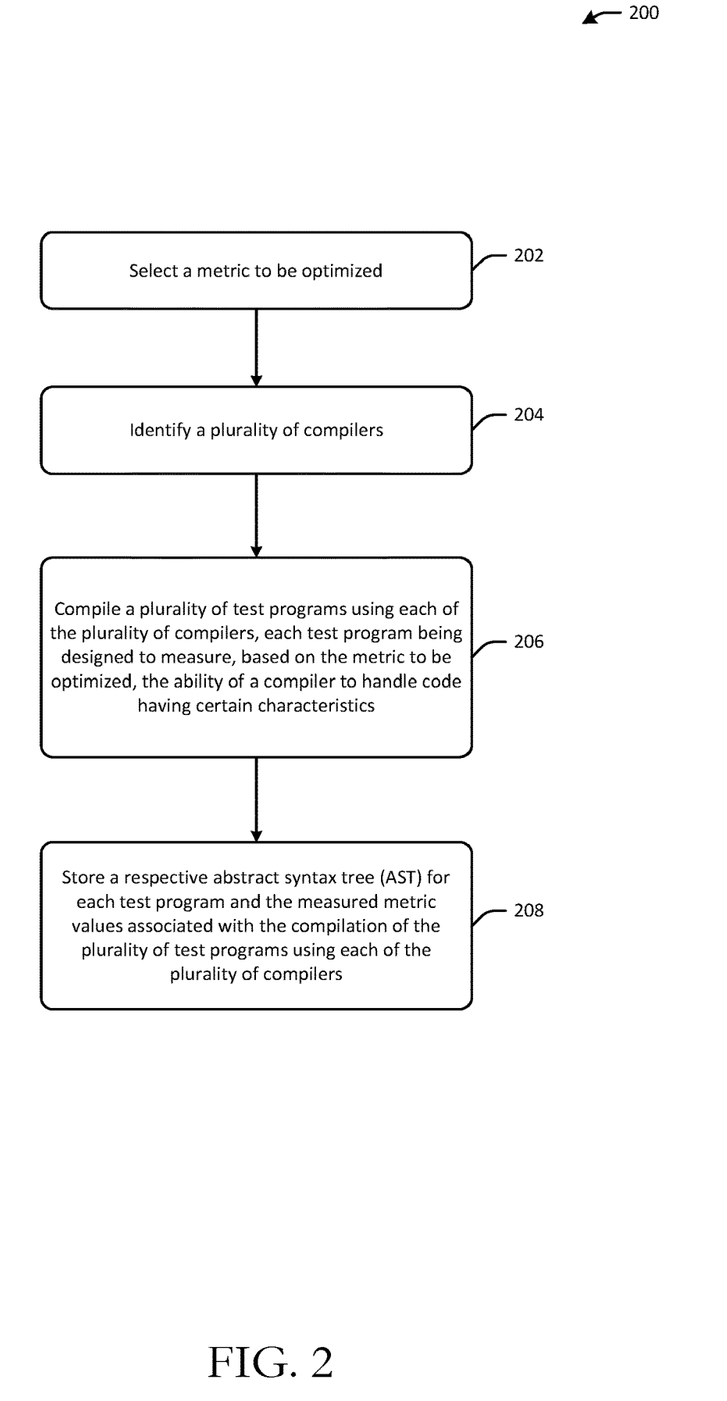
FIG. 2 is a process flow diagram of an illustrative method for compiling a collection of test programs using different compilers/compiler settings and calculating, for each compiled test program, a value of a metric to be optimized in accordance with one or more example embodiments.
Figure 3:
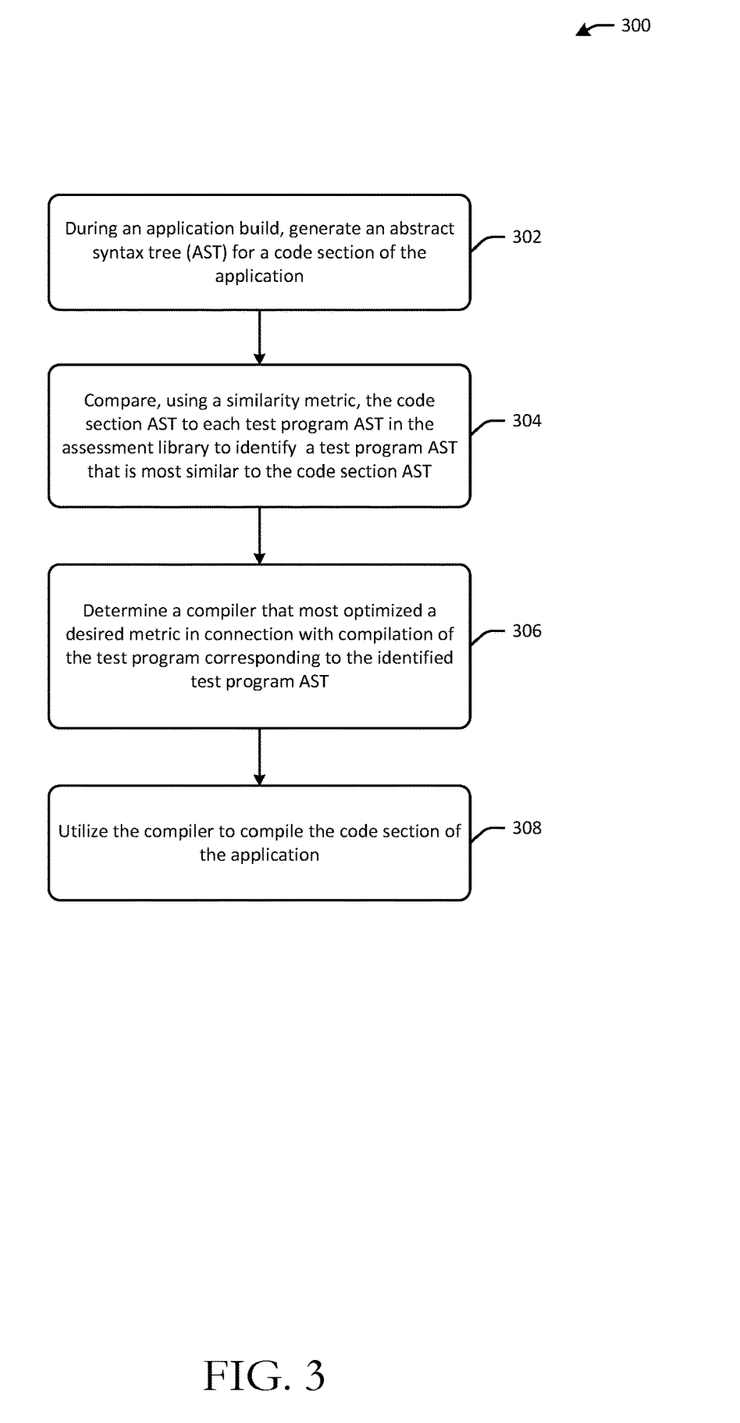
FIG. 3 is a process flow diagram of an illustrative method for selecting a compiler and/or a set of compiler options for compiling a section of computer-executable code in accordance with one or more example embodiments.

FIG. 1 is a schematic hybrid data flow/block diagram illustrating code section-specific compiler/compiler settings selection. FIG. 2 is a process flow diagram of an illustrative method 200 for compiling a collection of test programs using different compilers/compiler settings and calculating, for each compiled test program, a desired metric to be optimized. FIG. 3 is a process flow diagram of an illustrative method 300 for selecting a compiler and/or set of compiler options for compiling a section of computer-executable code. FIGS. 2 and 3 will each be described in conjunction with FIG. 1 hereinafter.

Referring first to FIG. 2 in conjunction with FIG. 1, at block 202 of the method 200, a metric 110 to be optimized may be selected. As previously noted, the metric 110 may be any metric of interest that is desirable to optimize (e.g., maximize or minimize) with respect to the compilation of computer-executable code and may include, without limitation, performance, binary size, security, reliability, scalability, and so forth. Example embodiments will be described hereinafter using performance as an example metric. However, it should be appreciated that any suitable metric may be used. Further, in certain example embodiments, compiler strengths and weaknesses may be assessed with respect to the same metric for each code section, while in other example embodiments different metrics may be utilized when determining which compilers to select for different code sections.

At block 204 of the method 200, a plurality of compilers 114 may be identified. Although example embodiments may be described herein in connection with the assessment and selection of different compilers, it should be appreciated that the plurality of compilers 114 may not only include different compilers but different combinations of compiler options/settings as well. In particular, the plurality of compilers 114 may include a collection of different compilers with no options as well as various combinations of settings/options for each compiler. For instance, the plurality of compilers 114 may include different compilers 1 to N, each with no compiler options selected, as well as, compiler 1 with various options selected; compiler 2 with various options selected; and so forth. For example, compiler 1 with a particular option/setting may be treated as a different compiler in the plurality of compilers 114 than compiler 1 with a second different option/setting.

At block 206 of the method 200, computer-executable instructions of one or more test program compilation modules 104 may be executed to compile a collection of test programs 112 using each of the plurality of compilers 114. Each test program may be designed to measure, based on the metric 110, the ability of a compiler to handle code having various code characteristics. The code characteristics may include any of those previously described. As a non-limiting example, the metric 110 to be optimized may be performance and the collection of test programs 112 may include, for example, a test program designed to evaluate a compiler's ability to perform loop unrolling. The test program may then be compiled using each of the plurality of compilers 114 to obtain respective compiled code for the test program that corresponds to each compiler 114. Each other test program in the collection of test programs 112 may also be compiled using each compiler in the plurality of compilers 114 to obtain a plurality of compiled test programs.

The plurality of compilers 114 may include, for example, any of a variety of known compilers and/or compiler option combinations such as the GNU Compiler Collection (gcc) with no options; gcc with —O; gcc with —O2; etc.; clang with no options; clang with —O; clang with —Os; clang with —Oz; etc.; xlc with no options; xlc with —O; xlc with —O and -qessl -qhot; xlc with —O2; xlc with —O2 and -qessl -qhot; etc. It should be appreciated that the compiler/compiler option combinations listed above are merely illustrative and not exhaustive.

In addition, at block 206 of the method 200, computer-executable instructions of one or more metric calculation modules 102 may be executed to calculate a value of the metric 110 for each compiled test program, that is, for each pairing of test program and compiler/compiler option combination. Continuing with the example introduced earlier, a performance of gcc with no options; a performance of gcc with —O; a performance of gcc with —O2; a performance of clang with no options; a performance of clang with —O; etc. may each be measured in connection with compilation of the test program designed to evaluate ability to perform loop unrolling. More generally, the performance of each of the plurality of compilers 114 may be measured in connection with a compilation of each test program in the collection of test programs 112.

At block 208 of the method 200, computer-executable instructions of the test program compilation module(s) 104 may be executed to store, in a data repository 116, representations of the test programs 112. In certain example embodiments, the stored representations of the test programs 112 may be a collection of ASTs 120 corresponding to the collection of test programs 112. In particular, a respective AST corresponding to each test program 112 may be stored in the repository 116. In addition, at block 208 of the method 200, computer-executable instructions of the metric calculation module(s) 102 may be executed to store, in the repository 116, the calculated metric values 118 corresponding to the compilation of each test program 112 using each compiler 114. In certain example embodiments, each calculated metric value 118 may be stored in association with the corresponding compiler/compiler option combination and the AST of the test program compiled using the corresponding compiler/compiler option combination.

Upon completion of the method 200, the repository 116 may store a library of ASTs 120 corresponding to the collection of test programs 112 along with the calculated metric values 118 corresponding to the compilation of each test program 112 using each of the plurality of compilers 114. The library of ASTs 120 along with the calculated metric values 118 may be collectively referred to herein as an assessment library. In certain example embodiments, the method 200 may be a one-time preparatory step. The result of the method 200—the assessment library—can be used for multiple builds in the same project or across multiple projects. Use of the assessment library to perform code section-specific selection of compilers will be described in more detail hereinafter in reference to the method 300 of FIG. 3. While the method 300 of FIG. 3 applies to compiler selection for a particular section of code, it should be appreciated that the method 300 can be repeated for each section of code in a file/project/application.

Referring now to FIG. 3 in conjunction with FIG. 1, at block 302 of the method 300, computer-executable instructions of one or more build modules 106 may be executed to generate, during an application build, a build-time AST 124 corresponding to a section of code 122. As previously noted, the section of code 122 may include any portion of code at any level of granularity. For instance, the section of code 122 may include a function, a file, a collection of functions, a collection of files in a project, or the like.

At block 304 of the method 300, computer-executable instructions of one or more compiler selection modules 108 may be executed to compare the build-time AST 124 corresponding to the code section 122 to each stored test program AST 120 in the assessment library to identify a test program AST 120 that is most similar to the build-time AST 124. Any suitable similarity metric for assessing the similarity between the build-time AST 124 and the stored ASTs 120 may be used including, but not limited to, topological similarity via subtree isomorphism or tree edit distance. The tree edit distance may indicate how many changes a query tree would have to undergo in order to exactly match a given subtree. Depending on the particular similarity metric that is chosen, a particular stored AST 120 may be determined to be most similar to the build-time AST 124 if the similarity metric between the particular stored AST 120 and the build-time AST 124 is largest among the similarity metrics between each stored AST 120 and the build-time AST 124 (e.g., topological similarity) or if the similarity metric between the particular stored AST 120 and the build-time AST 124 is smallest among the similarity metrics between each stored AST 120 and the build-time AST 124 (e.g., tree edit distance).

Once the stored AST 120 that is most similar to the build-time AST 124 is identified, computer-executable instructions of the compiler selection module(s) 108 may be executed to determine a compiler 126 (or compiler options combination) that most optimized the metric 110 in connection with compilation of the test program that corresponds to the most similar stored AST 120. In particular, the compiler/compiler option combination 126 that yielded the highest metric score (e.g., maximized or minimized the metric 110) for the test program corresponding to the most similar stored AST 120 may be determined at block 306 of the method 300. For instance, the compiler/compiler option combination 126 that maximized performance, minimized binary size, or the like for the test program corresponding to the most similar stored AST 120 may be determined at block 306 of the method 300. Then, at block 308 of the method 300, computer-executable instructions of the build module(s) 106 may be executed to compile the section of code 122 using the selected compiler/compiler options combination 126 to obtain compiled code 128.

In certain example embodiments, multiple stored test program ASTs 120 may be a similar distance from the build-time AST 124. For instance, a first similarity metric between a first stored test program AST 120 and the build-time AST 124 and a second similarity metric between a second stored test program AST 120 and the build-time AST 124 may each be larger (or smaller) than the similarity metrics between each other stored test program AST 120 and the build-time AST. In addition, a difference between the first similarity metric and the second similarity metric may be less than a threshold value, indicating that both the first stored test program AST and the second stored test program AST are each comparably similar to the build-time AST 124.

In such example embodiments, additional code properties may be used to compare the section of code 122 to the code samples (e.g., test programs) in the assessment library to determine which of the first stored test program AST or the second stored test program AST should be identified as most similar to the build-time AST 124. An illustrative and non-exhaustive list of such properties includes branch distances (e.g., ratio of long branches to short branches); clustering of arithmetic/logic instructions; length of carry chains; preponderance of data hazards; distances between branches to the link register (e.g., function returns); and so forth.

More specifically, a first feature vector may be generated for a first test program corresponding to the first stored test program AST; a second feature vector may be generated for a second test program corresponding to the second stored test program AST; and a third feature vector may be generated for the section of code 122. Each of the first feature vector, the second feature vector, and the third feature vector may contain respective values for one or more code properties such as those described above. The feature vectors may be provided as input to a machine learning algorithm, for example, to determine which of the first feature vector or the second feature vector is most similar to the third feature vector, and thus, which of the first stored test program AST or the second stored test program AST is most similar to the build-time AST 124.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
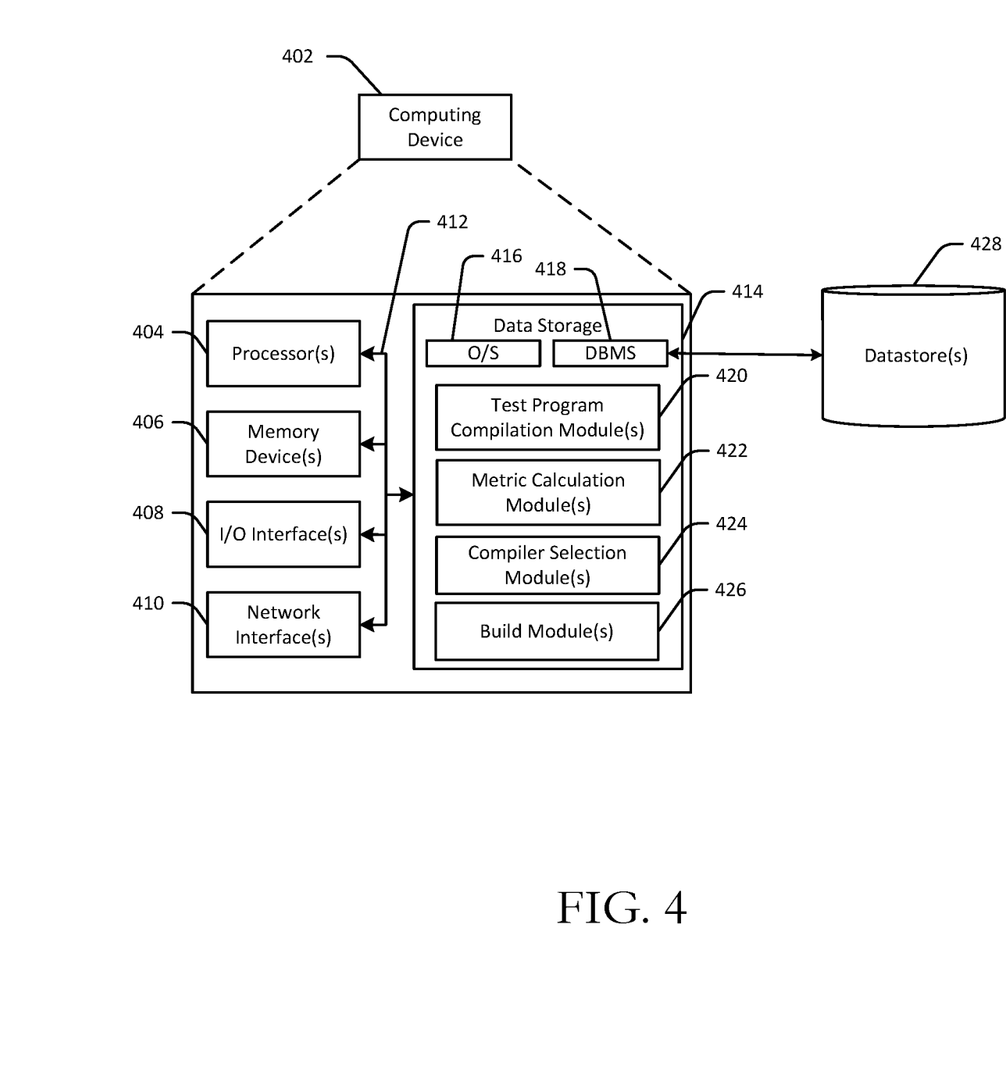
FIG. 4 is a schematic diagram of an illustrative computing device configured to implement one or more example embodiments.

FIG. 4 is a schematic diagram of an illustrative computing device 402 configured to implement one or more example embodiments of the disclosure. The computing device 402 may be any suitable device including, without limitation, a server, a personal computer (PC), a tablet, a smartphone, a wearable device, a voice-enabled device, or the like. While any particular component of the computing device 402 may be described herein in the singular, it should be appreciated that multiple instances of any such component may be provided, and functionality described in connection with a particular component may be distributed across multiple ones of such a component.

Although not depicted in FIG. 4, the computing device 402 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 402 may include one or more processors (processor(s)) 404, one or more memory devices 406 (generically referred to herein as memory 406), one or more input/output ("I/O")

interface(s) 408, one or more network interfaces 410, and data storage 414. The computing device 402 may further include one or more buses 412 that functionally couple various components of the computing device 402.

The bus(es) 412 may include at least one of a system bus, a memory bus, an address bus, or a message bus, and may permit the exchange of information (e.g., data (including computer-executable code), signaling, etc.) between various components of the computing device 402. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 406 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 406 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 406 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 414 may include removable storage and/or non-removable storage including, but not limited to, magnetic storage, optical disk storage, and/or tape storage. The data storage 414 may provide non-volatile storage of computer-executable instructions and other data. The memory 406 and the data storage 414, removable and/or non-removable, are examples of computer-readable storage media (CRSM) as that term is used herein.

The data storage 414 may store computer-executable code, instructions, or the like that may be loadable into the memory 406 and executable by the processor(s) 404 to cause the processor(s) 404 to perform or initiate various operations. The data storage 414 may additionally store data that may be copied to memory 406 for use by the processor(s) 404 during the execution of the computer-executable instructions. Moreover, output data generated as a result of execution of the computer-executable instructions by the processor(s) 404 may be stored initially in memory 406 and may ultimately be copied to data storage 414 for non-volatile storage.

More specifically, the data storage 414 may store one or more operating systems (O/S) 416; one or more database management systems (DBMS) 418 configured to access the memory 406 and/or one or more external datastores 428 (which may include the data repository 116); and one or more program modules, applications, engines, managers, computer-executable code, scripts, or the like such as, for example, one or more test program compilation modules 420, one or more metric calculation modules 422, one or more compiler selection modules 424, and one or more build modules 426. Any of the components depicted as being stored in data storage 414 may include any combination of software, firmware, and/or hardware. The software and/or firmware may include computer-executable instructions (e.g., computer-executable program code) that may be loaded into the memory 406 for execution by one or more of the processor(s) 404 to perform any of the operations described earlier in connection with correspondingly named modules.

Although not depicted in FIG. 4, the data storage 414 may further store various types of data utilized by components of the computing device 402 (e.g., data stored in the datastore(s) 428). Any data stored in the data storage 414 may be loaded into the memory 406 for use by the processor(s) 404 in executing computer-executable instructions. In addition, any data stored in the data storage 414 may potentially be stored in the external datastore(s) 428 and may be accessed via the DBMS 418 and loaded in the memory 406 for use by the processor(s) 404 in executing computer-executable instructions.

The processor(s) 404 may be configured to access the memory 406 and execute computer-executable instructions loaded therein. For example, the processor(s) 404 may be configured to execute computer-executable instructions of the various program modules, applications, engines, managers, or the like of the computing device 402 to cause or facilitate various operations to be performed in accordance with one or more embodiments of the disclosure. The processor(s) 404 may include any suitable processing unit capable of accepting data as input, processing the input data in accordance with stored computer-executable instructions, and generating output data. The processor(s) 404 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 404 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 404 may be capable of supporting any of a variety of instruction sets.

Referring now to other illustrative components depicted as being stored in the data storage 414, the O/S 416 may be loaded from the data storage 414 into the memory 406 and may provide an interface between other application software executing on the computing device 402 and hardware resources of the computing device 402. More specifically, the O/S 416 may include a set of computer-executable instructions for managing hardware resources of the computing device 402 and for providing common services to other application programs. In certain example embodiments, the O/S 416 may include or otherwise control the execution of one or more of the program modules, engines, managers, or the like depicted as being stored in the data storage 414. The O/S 416 may include any operating system now known or which may be developed in the future including, but not limited to, any server operating system, any mainframe operating system, or any other proprietary or non-proprietary operating system.

The DBMS 418 may be loaded into the memory 406 and may support functionality for accessing, retrieving, storing, and/or manipulating data stored in the memory 406, data stored in the data storage 414, and/or data stored in external datastore(s) 428. The DBMS 418 may use any of a variety of database models (e.g., relational model, object model, etc.) and may support any of a variety of query languages. The DBMS 418 may access data represented in one or more data schemas and stored in any suitable data repository. Data stored in the datastore(s) 428 may include, for example, calculated metric values, test program ASTs, similarity metrics, and so forth. External datastore(s) 428 that may be accessible by the computing device 402 via the DBMS 418 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 402, the input/output (I/O) interface(s) 408 may facilitate the receipt of input information by the computing device 402 from one or more I/O devices as well as the output of information from the computing device 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 402 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 402 may further include one or more network interfaces 410 via which the computing device 402 may communicate with any of a variety of other systems, platforms, networks, devices, and so forth. The network interface(s) 410 may enable communication, for example, with one or more other devices via one or more of the network(s).

It should be appreciated that the program modules/engines depicted in FIG. 4 as being stored in the data storage 414 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 402 and/or other computing devices accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 402 may include alternate and/or additional hardware, software, or firmware components beyond those described or depicted without departing from the scope of the disclosure. More particularly, it should be appreciated that software, firmware, or hardware components depicted as forming part of the computing device 402 are merely illustrative and that some components may not be present or additional components may be provided in various embodiments. While various illustrative modules have been depicted and described as software modules stored in data storage 414, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 or the method 300 may be performed by a computing device 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative methods of FIG. 2 or 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 or FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for compiling computer-executable code, the method comprising:
   selecting a metric to be optimized in connection with compilation of a section of the computer-executable code;
   compiling a plurality of test programs using each of a plurality of different compilers to obtain a plurality of compiled test programs, wherein each of the plurality of test programs are designed to measure, based on the metric, an ability of a compiler to handle code having various code characteristics;
   calculating, for each of the plurality of compiled test programs, a respective value of the metric;
   determining a particular test program of the plurality of test programs that has a highest metric score with the section of the computer-executable code;
   determining that the respective value of the metric is optimized for a particular compiled test program corresponding to the particular test program;
   determining which compiler of the plurality of compilers was used to compile the particular compiled test program; and
   compiling the section of the computer-executable code using the determined compiler,
   wherein determining that the respective value of the metric for the particular compiled test program is optimized comprises determining that the respective value of the metric calculated for the particular compiled test program is maximized or minimized as compared to the respective value of the metric calculated for each other compiled test program corresponding to the particular test program and wherein the metric to be optimized is one of performance, binary size, reliability, or scalability.

2. The computer-implemented method of claim 1, wherein compiling the plurality of test programs comprises generating a respective abstract syntax tree (AST) for each of the plurality of test programs, the computer-implemented method further comprising storing each respective AST in association with each respective value of the metric calculated for each compiled test program corresponding to the respective AST.

3. The computer-implemented method of claim 2, further comprising:
   generating a build-time AST corresponding to the section of the computer-executable code; and
   calculating a respective similarity metric between the build-time AST and the respective stored AST for each of the plurality of test programs,
   wherein determining the particular test program that has a highest metric score with the section of the computer-executable code comprises determining that the respective similarity metric between the build-time AST and the respective stored AST for the particular test program is maximized.

4. The computer-implemented method of claim 3, wherein each respective similarity metric is one of a topological similarity or a tree edit distance.

5. The computer-implemented method of claim 2, further comprising:
   generating a build-time AST corresponding to the section of the computer-executable code;
   calculating a respective similarity metric between the build-time AST and the respective stored AST for each of the plurality of test programs;
   determining that a first similarity metric between the build-time AST and a first stored AST and a second similarity metric between the build-time AST and a second stored AST are each greater than each other respective similarity metric;
   determining that a difference between the first similarity metric and the second similarity metric is less than a threshold value;
   generating, based at least in part on one or more code properties, a first feature vector for a first test program corresponding to the first stored AST, a second feature vector for a second test program corresponding to the second stored AST, and a third feature vector for the section of the computer-executable code; and
   providing the first feature vector, the second feature vector, and the third feature vector as input to a machine learning algorithm to determine which of the first test program or the second test program is the particular test program that has a highest metric score with the section of the computer-executable code.

6. A system for compiling computer-executable code, the system comprising:
   at least one memory storing computer-executable instructions; and
   at least one processor, wherein the at least one processor is configured to access the at least one memory and execute the computer-executable instructions to:
      select a metric to be optimized in connection with compilation of a section of the computer-executable code;
      compile a plurality of test programs using each of a plurality of different compilers to obtain a plurality of compiled test programs, wherein each of the plurality of test programs are designed to measure, based on the metric, an ability of a compiler to handle code having various code characteristics;
      calculate, for each of the plurality of compiled test programs, a respective value of the metric;
      determine a particular test program of the plurality of test programs that has a highest metric score with the section of the computer-executable code;
      determine that the respective value of the metric is optimized for a particular compiled test program corresponding to the particular test program;
      determine which compiler of the plurality of compilers was used to compile the particular compiled test program; and
      compile the section of the computer-executable code using the determined compiler,
      wherein determining that the respective value of the metric for the particular compiled test program is optimized comprises determining that the respective value of the metric calculated for the particular compiled test program is maximized or minimized as compared to the respective value of the metric calculated for each other compiled test program corresponding to the particular test program and wherein the metric to be optimized is one of performance, binary size, reliability, or scalability.

7. The system of claim 6, wherein the at least one processor is configured to compile the plurality of test programs by executing the computer-executable instructions to generate a respective abstract syntax tree (AST) for each of the plurality of test programs, and wherein the at least one processor is further configured to execute the computer-executable instructions to store each respective AST in association with each respective value of the metric calculated for each compiled test program corresponding to the respective AST.

8. The system of claim 7, wherein the at least one processor is further configured to execute the computer-executable instructions to:
generate a build-time AST corresponding to the section of the computer-executable code; and
calculate a respective similarity metric between the build-time AST and the respective stored AST for each of the plurality of test programs,
wherein the at least one processor is configured to determine the particular test program that has a highest metric score with the section of the computer-executable code by executing the computer-executable instructions to determine that the respective similarity metric between the build-time AST and the respective stored AST for the particular test program is maximized.

9. The system of claim 8, wherein each respective similarity metric is one of a topological similarity or a tree edit distance.

10. The system of claim 7, wherein the at least one processor is further configured to execute the computer-executable instructions to:
generate a build-time AST corresponding to the section of the computer-executable code;
calculate a respective similarity metric between the build-time AST and the respective stored AST for each of the plurality of test programs;
determine that a first similarity metric between the build-time AST and a first stored AST and a second similarity metric between the build-time AST and a second stored AST are each greater than each other respective similarity metric;
determine that a difference between the first similarity metric and the second similarity metric is less than a threshold value;
generate, based at least in part on one or more code properties, a first feature vector for a first test program corresponding to the first stored AST, a second feature vector for a second test program corresponding to the second stored AST, and a third feature vector for the section of the computer-executable code; and
provide the first feature vector, the second feature vector, and the third feature vector as input to a machine learning algorithm to determine which of the first test program or the second test program is the particular test program that has a highest metric score with the section of the computer-executable code.

11. A computer program product for compiling computer-executable code, the computer program product comprising a storage medium readable by a processing circuit, the storage medium storing instructions executable by the processing circuit to cause a method to be performed, the method comprising:
selecting a metric to be optimized in connection with compilation of a section of the computer-executable code;
compiling a plurality of test programs using each of a plurality of different compilers to obtain a plurality of compiled test programs, wherein each of the plurality of test programs are designed to measure, based on the metric, an ability of a compiler to handle code having various code characteristics;
calculating, for each of the plurality of compiled test programs, a respective value of the metric;
determining a particular test program of the plurality of test programs that has a highest metric score with the section of the computer-executable code;
determining that the respective value of the metric is optimized for a particular compiled test program corresponding to the particular test program;
determining which compiler of the plurality of compilers was used to compile the particular compiled test program; and
compiling the section of the computer-executable code using the determined compiler,
wherein determining that the respective value of the metric for the particular compiled test program is optimized comprises determining that the respective value of the metric calculated for the particular compiled test program is maximized or minimized as compared to the respective value of the metric calculated for each other compiled test program corresponding to the particular test program and wherein the metric to be optimized is one of performance, binary size, reliability, or scalability.

12. The computer program product of claim 11, wherein compiling the plurality of test programs comprises generating a respective abstract syntax tree (AST) for each of the plurality of test programs, the method further comprising storing each respective AST in association with each respective value of the metric calculated for each compiled test program corresponding to the respective AST.

13. The computer program product of claim 12, the method further comprising:
generating a build-time AST corresponding to the section of the computer-executable code; and
calculating a respective similarity metric between the build-time AST and the respective stored AST for each of the plurality of test programs,
wherein determining the particular test program that has a highest metric score with the section of the computer-executable code comprises determining that the respective similarity metric between the build-time AST and the respective stored AST for the particular test program is maximized.

14. The computer program product of claim 13, wherein each respective similarity metric is one of a topological similarity or a tree edit distance.

15. The computer program product of claim 12, the method further comprising:
generating a build-time AST corresponding to the section of the computer-executable code;
calculating a respective similarity metric between the build-time AST and the respective stored AST for each of the plurality of test programs;

determining that a first similarity metric between the build-time AST and a first stored AST and a second similarity metric between the build-time AST and a second stored AST are each greater than each other respective similarity metric;

determining that a difference between the first similarity metric and the second similarity metric is less than a threshold value;

generating, based at least in part on one or more code properties, a first feature vector for a first test program corresponding to the first stored AST, a second feature vector for a second test program corresponding to the second stored AST, and a third feature vector for the section of the computer-executable code; and providing the first feature vector, the second feature vector, and the third feature vector as input to a machine learning algorithm to determine which of the first test program or the second test program is the particular test program that has a highest metric score with the section of the computer-executable code.

* * * * *